United States Patent
Sirotkin et al.

(10) Patent No.: US 10,667,202 B2
(45) Date of Patent: *May 26, 2020

(54) ACCESS NETWORK DISCOVERY AND SELECTION

(71) Applicant: Intel IP Corporation, Santa Clara, CA (US)

(72) Inventors: Alexander Sirotkin, Petach Tikva (IL); Nageen Himayat, Fremont, CA (US); Sangeetha Bangolae, Beaverton, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/648,655

(22) Filed: Jul. 13, 2017

(65) Prior Publication Data

US 2017/0311235 A1 Oct. 26, 2017

Related U.S. Application Data

(63) Continuation of application No. 14/779,948, filed as application No. PCT/US2013/076244 on Dec. 18, 2013, now Pat. No. 9,736,762.

(Continued)

(51) Int. Cl.
*H04W 48/14* (2009.01)
*H04W 4/90* (2018.01)
(Continued)

(52) U.S. Cl.
CPC ........... *H04W 48/14* (2013.01); *H04W 4/025* (2013.01); *H04W 4/90* (2018.02); *H04W 8/005* (2013.01);
(Continued)

(58) Field of Classification Search
CPC ....... H04W 48/14; H04W 4/025; H04W 4/22; H04W 8/005; H04W 8/02; H04W 36/245;
(Continued)

(56) References Cited

U.S. PATENT DOCUMENTS

2010/0234042 A1* 9/2010 Chan ..................... H04W 28/08
2011/0317571 A1 12/2011 Kokkinen et al.
(Continued)

FOREIGN PATENT DOCUMENTS

CN 1689350 A 10/2005
CN 101981976 A 2/2011
(Continued)

OTHER PUBLICATIONS

International Search Report and Written Opinion dated Apr. 21, 2014 from International Application No. PCT/US2013/076244.
(Continued)

*Primary Examiner* — Ronald B Abelson
(74) *Attorney, Agent, or Firm* — Schwabe, Williamson & Wyatt, P.C.

(57) ABSTRACT

Embodiments of the present disclosure are directed towards devices and methods for identifying preferred access networks based at least in part on access network information including access network assistance information, steering policies, or access commands. In some embodiments, conflicts between access network information and access network discovery and selection function (ANDSF) policies may be rectified in identifying a preferred access network.

2 Claims, 8 Drawing Sheets

Related U.S. Application Data

(60) Provisional application No. 61/820,021, filed on May 6, 2013.

(51) Int. Cl.

| | | |
|---|---|---|
| *H04W 48/16* | (2009.01) | |
| *H04W 48/18* | (2009.01) | |
| *H04W 8/00* | (2009.01) | |
| *H04W 56/00* | (2009.01) | |
| *H04W 4/02* | (2018.01) | |
| *H04W 8/02* | (2009.01) | |
| *H04W 36/24* | (2009.01) | |
| *H04W 48/20* | (2009.01) | |
| *H04W 84/04* | (2009.01) | |
| *H04W 84/18* | (2009.01) | |

(52) U.S. Cl.
CPC ........... *H04W 8/02* (2013.01); *H04W 36/245* (2013.01); *H04W 48/16* (2013.01); *H04W 48/18* (2013.01); *H04W 48/20* (2013.01); *H04W 56/001* (2013.01); *H04W 84/045* (2013.01); *H04W 84/18* (2013.01)

(58) Field of Classification Search
CPC ..... H04W 48/16; H04W 48/18; H04W 48/20; H04W 56/001; H04W 76/02
See application file for complete search history.

(56) References Cited

U.S. PATENT DOCUMENTS

| | | | |
|---|---|---|---|
| 2012/0093031 A1 | 4/2012 | Wang et al. | |
| 2012/0188949 A1* | 7/2012 | Salkintzis | H04W 40/02 |
| 2012/0208502 A1 | 8/2012 | Perras | |
| 2012/0230304 A1* | 9/2012 | Barbu | H04W 80/00 |
| 2012/0259985 A1 | 10/2012 | Koskela et al. | |
| 2013/0012182 A1 | 1/2013 | Liao | |
| 2013/0265879 A1* | 10/2013 | Qiang | H04W 48/18 |
| | | | 370/235 |
| 2013/0308445 A1 | 11/2013 | Xiang et al. | |
| 2014/0192643 A1* | 7/2014 | Kalapatapu | H04W 48/00 |
| | | | 370/230 |
| 2014/0204904 A1* | 7/2014 | Xiang | H04W 36/0066 |
| | | | 370/331 |
| 2014/0233386 A1 | 8/2014 | Jamadagni et al. | |
| 2014/0241333 A1* | 8/2014 | Kim | H04W 48/16 |
| | | | 370/338 |
| 2015/0373603 A1 | 12/2015 | Jung et al. | |
| 2016/0165428 A1* | 6/2016 | Lee | H04W 8/005 |

FOREIGN PATENT DOCUMENTS

| | | |
|---|---|---|
| CN | 102007800 A | 4/2011 |
| CN | 102273279 A | 12/2011 |
| CN | 102300288 A | 12/2011 |
| CN | 102948220 A | 2/2013 |
| CN | 103037469 A | 4/2013 |
| EP | 2498549 A1 | 9/2012 |
| KR | 20120049555 A | 5/2012 |
| WO | 2014/168560 A1 | 10/2014 |

OTHER PUBLICATIONS

3GPP, "Technical Specification Group Services and System Aspects; Architecture enhancements for non-3GPP accesses (Release 12)," 3GPP TS 23.402 V12.0.0 (Mar. 2013), Mar. 8, 2013, Lte Advanced, 253 pages.
3GPP, "Technical Specification Group Core Network and Terminals; Access to the 3GPP Evolved Packet Core (EPC) via non-3GPP access networks; Stage 3 (Release 12)," 3GPP TS 24.302 V12.0.0 (Mar. 2013), Mar. 15, 2013, Lte Advanced, 61 pages.
Extended European Search Report dated Nov. 8, 2016 from European Patent Application No. 13884245.5.
Intel Corporation et al., "Text Proposal on WLAN/3GPP radio interworking solution 1," 3GPP TSG-RAN WG2 Meeting #82, R2-132192, Agenda Item: 5.1.1, May 20-24, 2013, Fukuoka, Japan, 3 pages.
CMCC, "Network Selection for WLAN/3GPP Radio Interworking," 3GPP TSG-RAN WG2 Meeting #81bis, R2-130973, Agenda Item: 5.1, Apr. 15-Apr. 19, 2013, Chicago, USA, 5 pages.
Haileselassie et al., "Study on Performance-Centric Offload Strategies for LTE Networks," Wireless and Mobile Networking Conference (WMNC), 2013 6th Joint IFIP, IEEE, Apr. 23, 2013, 10 pages.
3GPP, "Technical Specification Group Radio Access Network; Study on WLAN/3GPP Radio Interworking (Release 12)," 3GPP TR 37.834 V0.2.0 (Apr. 2013), May 3, 2013, Lte Advanced, 9 pages.
3GPP, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.5.0 (Mar. 2013), Mar. 18, 2013, Lte Advanced, 209 pages.
3GPP, "Technical Specification Group Radio Access Network; Evolved Universal Terrestrial Radio Access (E-UTRA); Radio Resource Control (RRC); Protocol specification (Release 11)," 3GPP TS 36.331 V11.3.0 (Mar. 2013), Mar. 18, 2013, Lte Advanced, 344 pages.
3GPP, "Technical Specification Group Core Network and Terminals; Access Network Discovery and Selection Function (ANDSF) Management Object (MO) (Release 12),"3GPP TS 24.312 V12.0.0 (Mar. 2013), Mar. 15, 2013, 173 pages.
Chinese Patent Office—Second Office Action dated Sep. 30, 2018 from Chinese Patent Application No. 2013800752774, 29 pages.
Intel Corporation, "Text proposal on WLAN/3GPP radio Interworking solution directions," 3GPP TSG-RAN WG2 Meeting #81bis, R2-131506, Agenda item: 5.1, Apr. 15-19, 2013, Chicago, USA, 2 pages.
Intel Corporation et al., "Way forward for WLAN/3GPP radio interworking SI," 3GPP TSG RAN2 Meeting #81bis, R2-131336, Apr. 15-19, 2013, Chicago, USA, 1 page.
Intel Corporation, "Email discussion report on Wlan/3GPP radio interworking scenarios," 3GPP TSG RAN2 Meeting #81bis, R2-131340, Apr. 15-19, 2013, Chicago, USA. 8 pages.
Intel Corporation, "Text proposal on WLAN/3GPP radio Interworking scenarios and use cases," 3GPP TSG RAN2 Meeting #81bis, R2-131346, Apr. 15-19, 2013, Chicago, USA, 2 pages.
Intel Corporation, "WLAN3GPP access network selection based on maximum achievable rate metric," 3GPP TSG RAN2 Meeting #81bis, R2-131348, Agenda Item: 5.1, Apr. 15-19, 2013, Chicago, USA, 8 pages.
3GPP, "Technical Specification Group Radio Access Network; WLAN/3GPP Radio Interworking (Release 12)," 3GPP TR 37.834 V0.1.1 (Apr. 2013), Lte Advanced, 9 pages.
European Patent Office—Extended European Search Report dated Sep. 13, 2018 from European Divisional Application No. 18178774. 8, 12 pages.
3GPP, "Technical Specification Group Radio Access Network; Study on WLAN/3GPP radio interworking (Release 12)," 3GPP TR 37.834 V2.0.0 (Nov. 2013), Lte Advanced, 19 pages.
LG Electronics Inc., "Issues on relation with ANDSF," 3GPP TSG-RAN2 Meeting #82, R2-132057, Agenda Item: 5.1.1, May 20-May 24, 2013, Fukuoka, Japan, 2 pages.

* cited by examiner

ACCESS NETWORK DISCOVERY AND SELECTION

CROSS REFERENCE TO RELATED APPLICATIONS

The present application is a continuation of U.S. patent application Ser. No. 14/779,948, filed Sep. 24, 2015, entitled "ACCESS NETWORK DISCOVERY AND SELECTION," which is a national phase entry under 35 U.S.C. § 371 of International Application No. PCT/US2013/076244, filed Dec. 18, 2013, entitled "ACCESS NETWORK DISCOVERY AND SELECTION", which claims priority to U.S. Provisional Patent Application No. 61/820,021, filed May 6, 2013, entitled "Advanced Wireless Communication Systems and Techniques," the entire disclosures of which are hereby incorporated by reference in their entireties.

FIELD

Embodiments of the present disclosure generally relate to the field of wireless communications, and more particularly, methods and storage media for a user equipment (UE) to discover and select radio access networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Typically, cellular networks need to be able to handoff or offload user equipment (UEs) to wireless local area networks (WLANs). UEs may also need to know how to direct traffic across multiple networks including both radio access network (RANs) and WLANs. An example of a cellular network may include a 3G or 4G network such as those defined by third generation partnership project (3GPP) specifications. An example of a WLAN may include a Wi-Fi network such as those described by the Institute of Electrical and Electronics Engineers (IEEE) 802.11 specifications. In certain embodiments, the cellular network operator may set static policies for the UE to access the WLAN.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
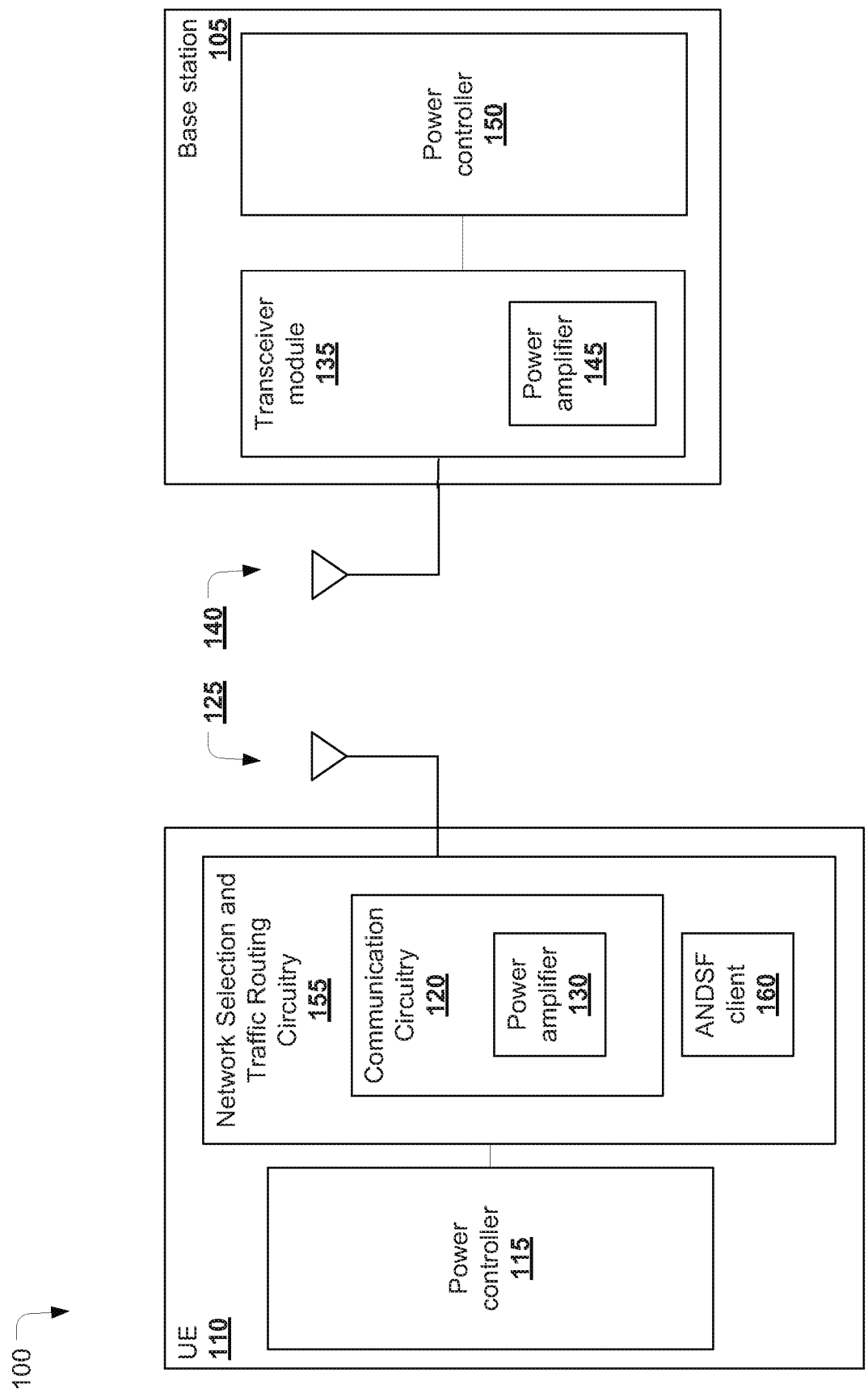
FIG. 1 schematically illustrates a high-level example of a network system comprising a UE and a base station, in accordance with various embodiments

Apparatuses, methods, and storage media are described herein for allowing a UE to use information received from at least one of a RAN or WLAN to identify a preferred access network. The information may include one or more of access network assistance information, steering policies, or access commands. In some embodiments, the UE may resolve conflicts between the RAN rules based on the information received from the RAN and/or WLAN and an ANDSF policy. In some embodiments, the UE may utilize enhanced ANDSF policies to account for the information received from the RAN and/or WLAN.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with" along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "circuitry" refers to, is part of, or includes hardware components such as an Application Specific Integrated Circuit (ASIC), an electronic circuit, a logic circuit, a processor (shared, dedicated, or group) and/or memory (shared, dedicated, or group) that are configured to provide the described functionality. In some embodiments, the circuitry may execute one or more software or firmware programs to provide at least some of the described functionality.

As used herein, the term "module" may refer to, be part of, or include an Application Specific Integrated Circuit (ASIC), an electronic circuit, a system-on-chip (SoC), a processor (shared, dedicated, or group) and/or memory (shared, dedicated, or group) that execute one or more software or firmware programs, a combinational logic circuit, and/or other suitable components that provide the described functionality.

Although discussed herein generally in the context of third generation partnership project (3GPP) long term evolution (LTE) UEs, the concepts and techniques discussed herein may be applicable to other access networks including, but not limited to, universal mobile telecommunications system (UMTS) and mobile equipment associated therewith.

FIG. 1 schematically illustrates a wireless communication network 100 in accordance with various embodiments. Wireless communication network 100 (hereinafter "network 100") may be a cellular network, for example a 3GPP long term evolution (LTE) network such as an evolved universal terrestrial radio access network (E-UTRAN). In other embodiments, the network 100 may be a WLAN such as an IEEE 802.11 Wi-Fi network. The network 100 may include an access node 105, configured to wirelessly communicate with a UE 110. The base station 105 may be a 3GPP eNodeB (eNB) or a WLAN access point (AP). The UE 110 may be configured to communicate with one or more of a 3GPP eNB or a WLAN AP either one at a time or substantially in parallel with one another.

As shown in FIG. 1, the UE 110 may include communication circuitry 120. The communication circuitry 120 may be further coupled with an antenna 125 of the UE 110 for communicating wirelessly with other components of the network 100, e.g., base station 105. The antenna 125 may be powered by a power amplifier 130, which may be a component of the communication circuitry 120, as shown in FIG. 1, or may be a separate component of the UE 110. In one embodiment, the power amplifier 130 provides the power for all transmissions on the antenna 125. In other embodiments, there may be multiple power amplifiers, multiple antennas, or both, on the UE 110. In embodiments, the UE 110 may include network selection and traffic routing circuitry 155, which may include one or more processors or controllers. The communication circuitry 120 may be part of the network selection and traffic routing circuitry 155 as shown, while in other embodiments the communication circuitry 120 may be separate from the network selection circuitry 155. The network selection and traffic routing circuitry 155 may be configured to determine whether a UE 110 should connect to an eNB or an AP of a network. If the UE 110 has the option of connecting to multiple networks simultaneously, the network selection and traffic routing circuitry 155 may be configured to determine which traffic should be routed to which access network. For instance, the network selection and traffic routing circuitry 155 may also be configured to identify a preferred access network or select traffic routing policies based on local UE criteria and/or access network discovery and selection function (ANDSF) policies.

The network selection and traffic routing circuitry 155 may further include, or otherwise provide, an ANDSF client 160. The ANDSF client 160 may be configured to interpret ANDSF policies and identify a preferred access network based on ANDSF policies. The ANDSF client 160 may be part of, or provided by, network selection and traffic routing circuitry 155 and/or communication circuitry 120, as shown, while in other embodiments the ANDSF client 160 may be separate from the network selection and traffic routing circuitry 155 and/or the communication circuitry 120. Additionally or alternatively, if the UE is capable of using multiple accesses simultaneously, the ANDSF client 160 may be configured to interpret ANDSF policies and identify which traffic should be routed to which access network.

The base station 105 may include a transceiver module 135 coupled with an antenna 140 of the base station 105 for communicating wirelessly with a network component such as the UE 110. The base station 105 may further include a power amplifier 145 coupled with the transceiver module 135 and a power controller 150. In one embodiment, the power amplifier 145 provides the power for all transmissions on the antenna 140. In other embodiments, there may be multiple power amplifiers or multiple antennas, or both, on the base station 105.

Figure 2:
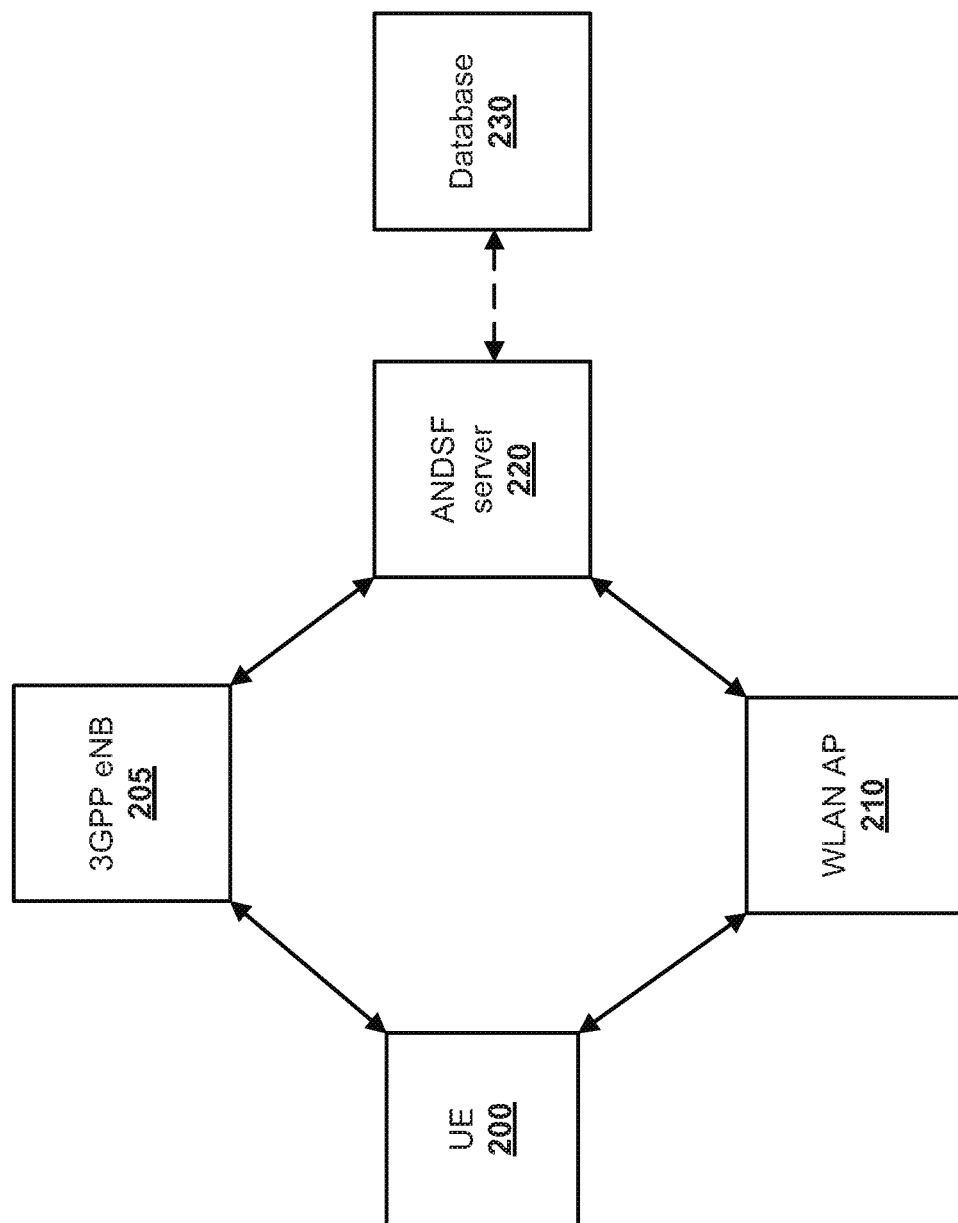
FIG. 2 illustrates an example of a multi-operator network including both cellular and WLAN entities, in accordance with various embodiments.

FIG. 2 depicts an example of a system including elements of both a cellular network and a WLAN. In embodiments, a UE 200, which may be similar to UE 110 described above, may be communicatively coupled with a 3GPP eNB 205 and a WLAN AP 210. In embodiments, the 3GPP eNB 205 may be the same as, or substantially similar to, the base station 105 described above. Similarly, the WLAN AP 210 may be the same as, or substantially similar to, the base station 105 described above.

In embodiments, one or both of the 3GPP eNB 205 and/or the WLAN AP 210 may be communicatively coupled with an ANDSF server 220. In embodiments, the ANDSF server 220 may be a server in the 3GPP network which may be controlled by the 3GPP network operator. The ANDSF server 220 may be communicatively coupled with one or more 3GPP eNBs 205 or WLAN APs 210, which in turn serve one or more UEs in the 3GPP network.

In some embodiments, the ANDSF server 220 may be communicatively coupled with one or more databases 230. In some embodiments, the database 230 may store policies including threshold values related to characteristics of an access network. In some embodiments, the database 230 may store quality of service (QoS) policies, which may be part of the ANDSF policies. Additionally or alternatively, the database 230 may store data related to one or more cellular networks such as a 3G/4G network. In some embodiments, the database 230 may be part of the ANDSF server 220. In other embodiments, the database 230 may be communicatively coupled with the ANDSF server 220, for example by direct connection, via a wireless link such as a WLAN or a 3G or 4G cellular network, through the Internet, or via some other manner of communicative coupling.

In some embodiments, the database 230 may use the data in the database 230 to create one or more ANDSF policies, for example policies based on data related to the cellular or WLAN networks, including but not limited to network load, signal strength, maximum achievable throughput, average access delay, and/or QoS support. The database 230 may then transfer the QoS or ANDSF policy to the ANDSF server 220. In other embodiments, the database of 230 may transfer the data, for example the cellular or WLAN network data, to the ANDSF server 220, which in turn may create new ANDSF policies. If the ANDSF server 220 creates the ANDSF policies, then the ANDSF server 220 may transmit one or more of the ANDSF policies to one or more of the UEs 200. In some embodiments, ANDSF policies may be transmitted from the ANDSF server 220 to the UE 200 via short message service (SMS), using an internet protocol (IP) level protocol such as simple object access protocol extensible markup language (SOAP-XML), or open mobile alliance device management (OMA-DM).

In embodiments, the ANDSF policies may allow the UE 200, and specifically the network selection and traffic routing circuitry 155 of the UE, to determine whether an access network is an access network with which the UE 200 should connect. For example, in some embodiments the UE 200 may want to disconnect from the 3GPP eNB 205 for a variety of reasons such as convenience, congestion of the 3GPP network, direction from a user of the UE 200, or some other reason. In these embodiments, the UE 200 may use one or more ANDSF policies to determine whether it is acceptable to connect with the WLAN AP 210, or if there are plural WLAN APs, to which the UE 200 may connect. UE 200 may also utilize the ANDSF policies to steer data across a plurality of access networks if UE 200 is equipped to communicate via multiple access networks in parallel. Additionally or alternatively, the ANDSF policies may allow the UE 200 to route different types of traffic to 3GPP eNB 205 and WLAN AP 210 based on ANDSF policies.

In some embodiments, it may be advantageous for one or more of the ANDSF policies to include threshold values related to characteristics of an access network. Including such threshold values may allow the UE 200 to selectively enable a given ANDSF policy only if measured access network characteristics (e.g. signal strength, load) meet the threshold requirements. ANDSF policies including these threshold values may be referred to as enhanced ANDSF policies.

In some embodiments, the UE 200 may receive access network information directly from an access network. For instance, UE 200 may receive information from 3GPP eNB 205 or WLAN AP 210 regarding characteristics of the access network. This information may include, but is not limited to, access network assistance information, steering policies, or access commands. Access network assistance information may include, but is not limited to network load (or other parameter based on load), signal strength, maximum achievable throughput, average access delay, and/or QoS support. A steering policy may include a list of available access networks. The list of available access networks may further include priority values associated with the networks to aid the UE 200 in identifying a preferred access network. An access command may include a specific directive to a UE 200 to access a particular access network.

In some embodiments, the UE 200 may receive the access network information discussed above from an eNB such as 3GPP eNB 205, a WLAN AP such as WLAN AP 210, or both an eNB and a WLAN AP. For instance, it may be possible for each of an eNB and a WLAN AP to provide information regarding its respective network characteristics. In some embodiments, an eNB or a WLAN AP may provide information regarding a plurality of access networks. An eNB may provide access network information via broadcast or dedicated signaling such as radio resource control (RRC) signaling. A WLAN AP may provide access network information via beacon frames, probe response frames, or an 802.11u message exchange.

Figure 3:
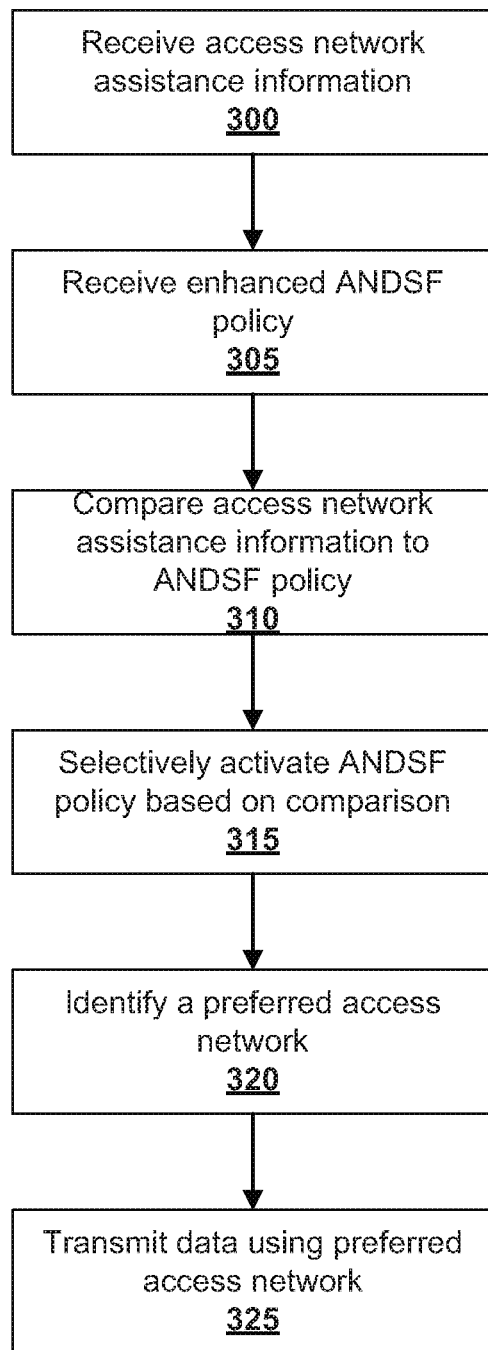
FIG. 3 illustrates an example of an access network identification procedure, in accordance with various embodiments.

FIG. 3 illustrates an example of an access network selection and traffic routing procedure, in accordance with various embodiments. At 300 a UE, such as UE 200, may receive access network assistance information. The UE 200 may receive the access network assistance information from one or both of an eNB or a WLAN AP as discussed above. The access network assistance information may include, but is not limited to network load (or some other parameter based on load), signal strength threshold, maximum achievable throughput, average access delay, and/or QoS support.

At 305 the UE may receive an enhanced ANDSF policy. Alternatively, ANDSF policy may be available in the UE in advance. The enhanced ANDSF policy may include one or more default thresholds related to access network characteristics. The thresholds may correspond to the access network assistance information. In some instances the UE may receive a plurality of ANDSF policies. Each of the ANDSF polices may be associated with different access networks. Each of the ANDSF polices may include one or more thresholds related to one or more access network characteristics, which may correspond to the access network assistance information. If the UE has received signal strength thresholds from the access networks (in step 300) default thresholds in ANDSF policy are replaced with up-to-date dynamic thresholds received from the access network.

At 310 the UE may compare the access network assistance information to the ANDSF policy. For instance, the UE may compare access network assistance information (e.g. load or some parameter based on load) to a corresponding threshold included in an ANDSF policy to determine if the access network satisfies the ANDSF policy threshold. Additionally or alternatively, the UE may measure certain access network characteristics (e.g. signal strength) and compare these measurements to a corresponding threshold included in an ANDSF policy.

At 315 the UE may selectively activate one or more ANDSF policies based on the comparison of the access network assistance information and measurements to the corresponding thresholds in the ANDSF policy. In doing so, the UE may be able to activate only those ANDSF policies for which the access network satisfies the ANDSF policy threshold. In this manner, the enhanced ANDSF policies may allow the UE to utilize access network assistance information received directly by the UE when identifying a preferred access network.

At 320 the UE may identify a preferred access network. For instance, an ANDSF client, such as ANDSF client 160, may interpret any activated ANDSF policies to identify a preferred access network. In some embodiments where the UE is equipped to communicate via multiple access networks in parallel the preferred access network may include a plurality of preferred access networks, in which case active ANDSF policy determines which traffic types are routed to which access network.

At 325 the UE may transmit data using the preferred access network. This may include transmitting any form of data. In some embodiments the UE may utilize different access networks for different types of data. For instance, in some embodiments the UE may transmit voice data over one access network and other data over a second access network.

Figure 4:
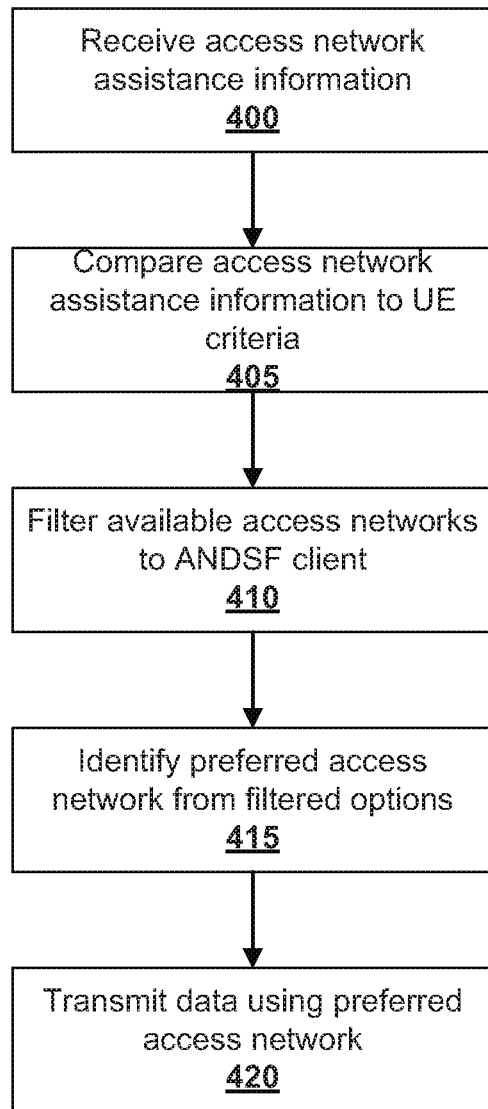
FIG. 4 illustrates an example of an access network identification procedure, in accordance with various embodiments.

FIG. 4 illustrates an example of an access network selection and traffic routing procedure, in accordance with various embodiments. At 400 a UE, such as UE 200, may receive access network assistance information. The UE 200 may receive the access network assistance information from one or both of an eNB or a WLAN AP as discussed above. The access network assistance information may include, but is not limited to network load (or some other parameter based on load), signal strength threshold, maximum achievable throughput, average access delay, and/or QoS support.

At 405 the UE may compare the access network assistance information and UE measurements to local UE criteria (also referred to as "RAN rules") or thresholds. The local UE criteria or thresholds may be associated with access networks. The local UE criteria or thresholds may be preset or dynamically determined. In some embodiments, the UE may dynamically determine the local UE criteria or thresholds based on requirements of applications active on the UE. For instance, the UE may dynamically determine the local UE criteria or thresholds based on QoS requirements of one or more applications active on the UE.

At 410 the UE may filter available access networks to an ANDSF client. By filtering available access networks to an ANDSF client, the UE may prevent the ANDSF client from considering access networks that do not meet the local UE criteria or thresholds when identifying a preferred access network. This may be combined with the use of enhanced ANDSF policies discussed above, but is particularly advantageous in circumstances where the ANDSF policies have not been enhanced to account for access network assistance information. In this manner the local UE criteria or thresholds allow the UE to consider the access network assistance information in the identification of the preferred access network even in those circumstances where the ANDSF policies have not been enhanced to include thresholds.

At 415 the UE may identify a preferred access network from the filtered options provided at 410. For instance an ANDSF client, such as ANDSF client 160, may interpret ANDSF policies to identify a preferred access network. The ANDSF policies may not be enhanced policies. In this manner, the UE may account for the access network assistance information by preventing the ANDSF client from considering access networks that do not meet the local UE criteria or thresholds. This may allow the UE to utilize access network assistance information while interacting with networks using traditional or legacy ANDSF policies.

At 420 the UE may transmit data using the preferred access network. This may include transmitting any form of data. In some embodiments the UE may utilize different access networks for different types of data. For instance, in some embodiments the UE may transmit voice data over one access network and other data over a second access network. Additionally or alternatively, the UE may use multiple access networks simultaneously for data transmission.

Figure 5:
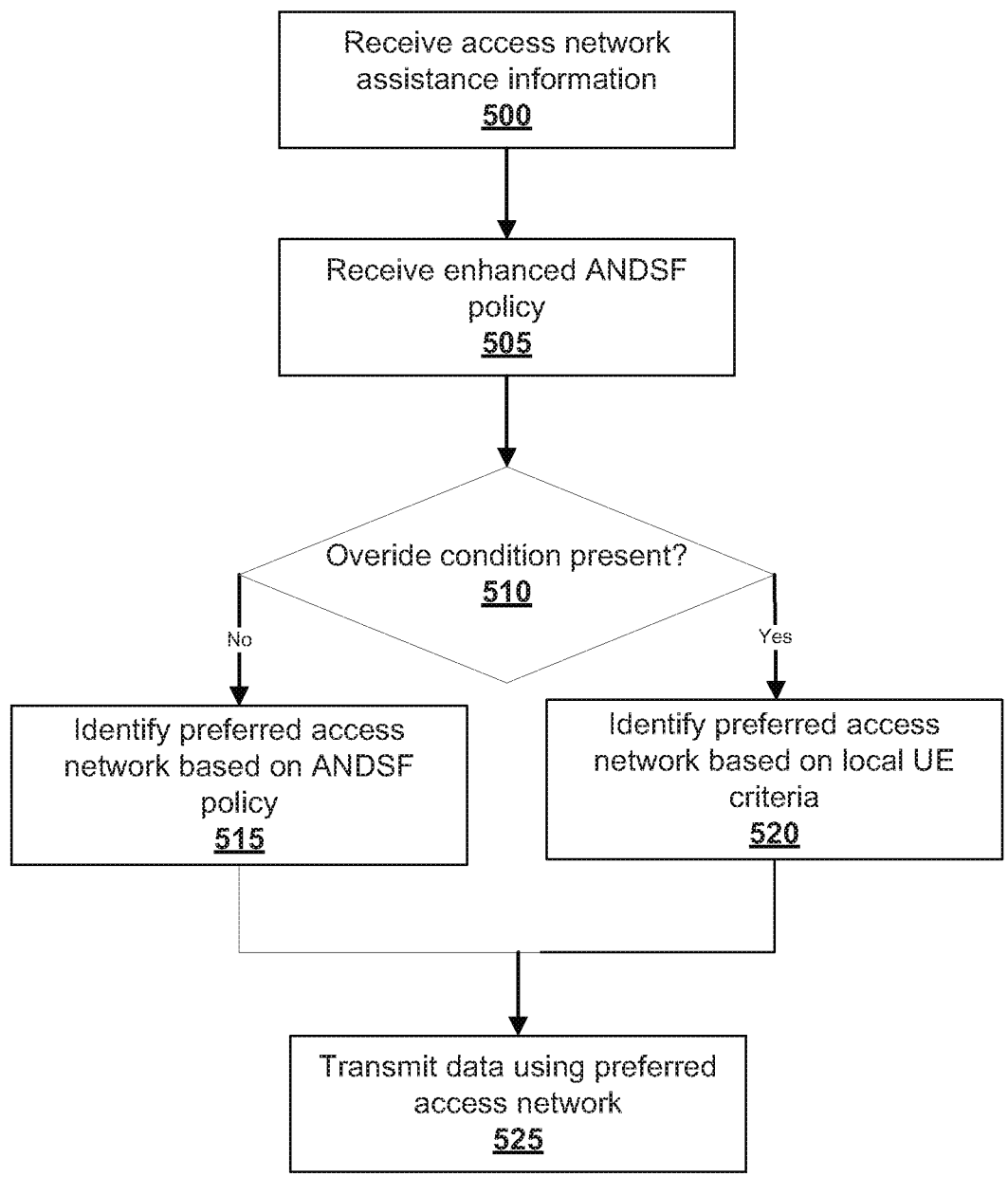
FIG. 5 illustrates an example of an access network identification procedure, in accordance with various embodiments.

FIG. 5 illustrates an example of an access network selection and traffic routing procedure, in accordance with various embodiments. At 500 a UE, such as UE 200, may receive access network assistance information. The UE 200 may receive the access network assistance information from one or both of eNB or WLAN AP as discussed above. The access network assistance information may include, but is not limited to network load (or some parameter based on load), signal strength threshold, maximum achievable throughput, average access delay, and/or QoS support.

At 505 the UE may receive an enhanced ANDSF policy. The enhanced ANDSF policy may include one or more default thresholds related to access network characteristics. The thresholds may correspond to the access network assistance information. In some instances the UE may receive a plurality of ANDSF policies. Each of the ANDSF polices may be associated with different access networks. Each of the ANDSF polices may include one or more thresholds related to one or more access network characteristics which may correspond to the access network assistance information.

At 510 the UE may determine if an override conditions is present. Override conditions may be any condition under which the UE may override the ANDSF policy when identifying a preferred access network. In some embodiments, the UE may be able to determine based on the access network assistance information and/or other information that a particular access network is a better option at the time than an access network identified by the ANDSF policy. For instance, the UE may be able to determine that the estimated throughput on a particular network is higher over a particular time period than that of a different network such as a network identified by the ANDSF policy. The amount by which the estimated throughput must exceed that of the alternative networks in order to trigger the override condition may be dynamically set by the UE. For instance the UE may take into account local interference when determining the amount by which the estimated throughput must exceed that of the alternative networks. This may allow the UE to utilize the best access network given the UEs particular position and surroundings even if it may not be the preferred access network based on the ANDSF policy. Additionally or alternatively, the UE may use a flag (pre-configured in the UE, received from the network via RRC, ANDSF or some other protocol or in any other way) which determines whether enhanced ANDSF policies or UE local conditions (also referred to as "RAN rules") should take precedence.

The override conditions may also allow the UE to utilize an access network based on local requirements even if the access network assistance information does not satisfy the threshold for a particular ANDSF policy. In this manner the UE may be able to determine that the applications active on the UE can tolerate network characteristics that are insufficient to satisfy the threshold for an ANDSF policy related to the network. Where possible the UE may identify access networks that satisfy both the local UE criteria and the ANDSF policies but when particular override conditions exist the UE may be able to ignore the ANDSF policy and directly identify the preferred access network based on the local UE criteria.

If an override condition is not present, then the UE, at 515, may identify a preferred access network based on the ANDSF policy. Although not specifically shown, this may include selectively activating one or more ANDSF policies based on comparisons of the access network assistance information and ANDSF policy thresholds as discussed previously.

If an override condition is present, then the UE, at 520, may identify a preferred access network based on local UE criteria. This may involve ignoring networks identified according to ANDSF policies or filtering certain access networks and then using ANDSF policies only for access networks that pass local UE criteria (also referred to as "RAN rules").

At 525 the UE may transmit data using the preferred access network. This may include transmitting any form of data. In some embodiments the UE may utilize different access networks for different types of data. For instance, in some embodiments the UE may transmit voice data over one access network and other data over a second access network.

Figure 6:
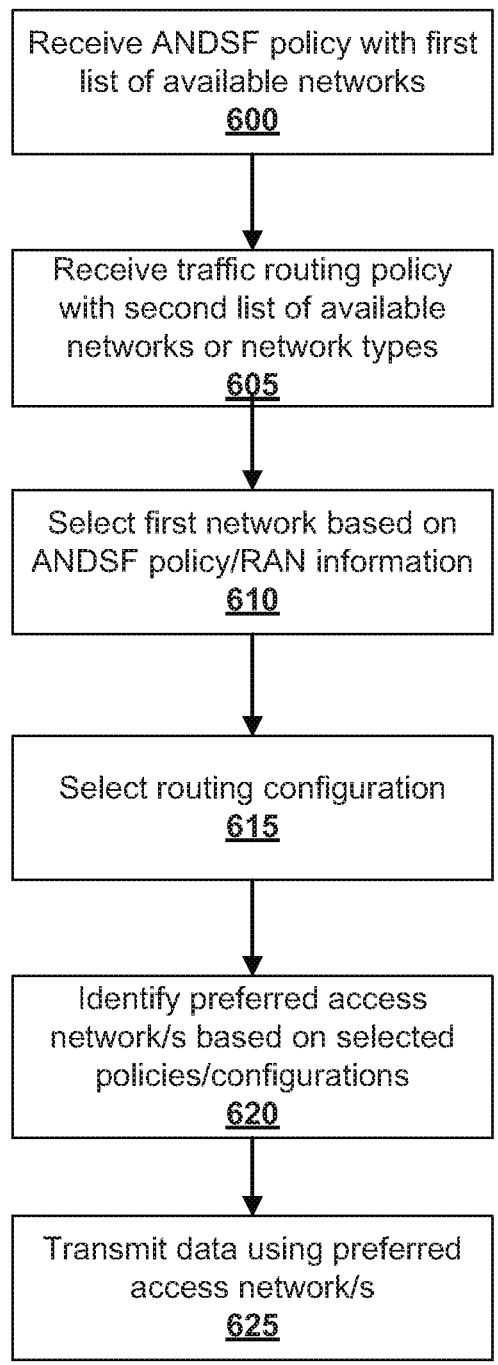
FIG. 6 illustrates an example of an access network identification procedure, in accordance with various embodiments.

FIG. 6 illustrates an example of an access network selection and traffic routing procedure, in accordance with various embodiments. At 600 a UE, such as UE 200, may receive an ANDSF policy with a first list of available networks, e.g. a list of WLAN networks the UE may use. The first list of available networks may provide priority values for the available networks.

At 605 the UE may receive a traffic routing policy with a second list of available networks types, e.g., LTE, UMTS and WLAN. The second list of available networks may provide priority values for the available networks and policies associating different traffic types to different network types. The UE 200 may receive the traffic routing policy from one or both of an eNB or a WLAN AP as discussed above.

At 610 the UE may select a first network based on the ANDSF policy and RAN information. This may include comparing information received from an access network or information calculated by the UE to the ANDSF policy. For instance, the UE may use the ANDSF policy to determine which of a plurality of the WLANs to utilize when transmitting data.

At 615 the UE may select a traffic routing configuration based on the traffic routing policy and/or RAN information. This may include comparing information received from an access network or information calculated by the UE to the traffic routing policy. This may include identifying one or more network types (e.g., LTE, UMTS and WLAN) to utilize for data transmission. If traffic routing configuration includes transmitting data over the type of network identified by the ANDSF policy, the first network selected at 610 may be utilized. The routing configuration may identify a single type of network for data transmission or may identify a plurality of network types over which data is to be transmitted.

At 620 the UE may identify one or more preferred access networks based on one or more of the previously selected first network, the ANDSF policy, and the traffic routing configuration. This may include identifying the first selected network as the preferred access network, or as one of a plurality of preferred access networks, if the traffic routing configuration includes utilizing a network associated with the first selected network and/or the ANDSF policy. While selection of the first network is shown first, it should be appreciated that selection of the first network may occur simultaneously with the identification of preferred access networks. Identifying the one or more preferred access networks may include comparing the traffic routing configuration to the ANDSF policy or comparing priorities associated with the traffic routing configuration to the ANDSF policy. For instance if the traffic routing configuration indicates that traffic is to be routed to a particular type of network (e.g., WLAN) associated with the ANDSF policy, the selection of the specific network of this type may be limited by the ANDSF policy. Similar to the situation discussed above, it is possible to include override conditions in the identification of the one or more preferred access networks. In some embodiments, the ANDSF policy may override the traffic steering policy for access networks associated with a UE subscription service or business rules. This may allow an access network provider to dictate levels of service for subscribers based on subscription agreements. Where access network selection is to be based on characteristics of the access network the traffic steering policy may be allowed to override the ANDSF policy. This may be advantageous as the traffic steering policy may be provided directly by the access network and may be dynamically updated based on current access network characteristics. In this manner the preferred access network may be identified based on current access network characteristics as opposed to ANDSF policies that may be updated less frequently or that may not account for specific access network characteristics.

At 625 the UE may transmit data using the one or more preferred access networks. This may include transmitting any form of data. In some embodiments the UE may utilize different access networks for different types of data. For instance, in some embodiments the UE may transmit voice data over one access network and other data over a second access network.

Figure 7:
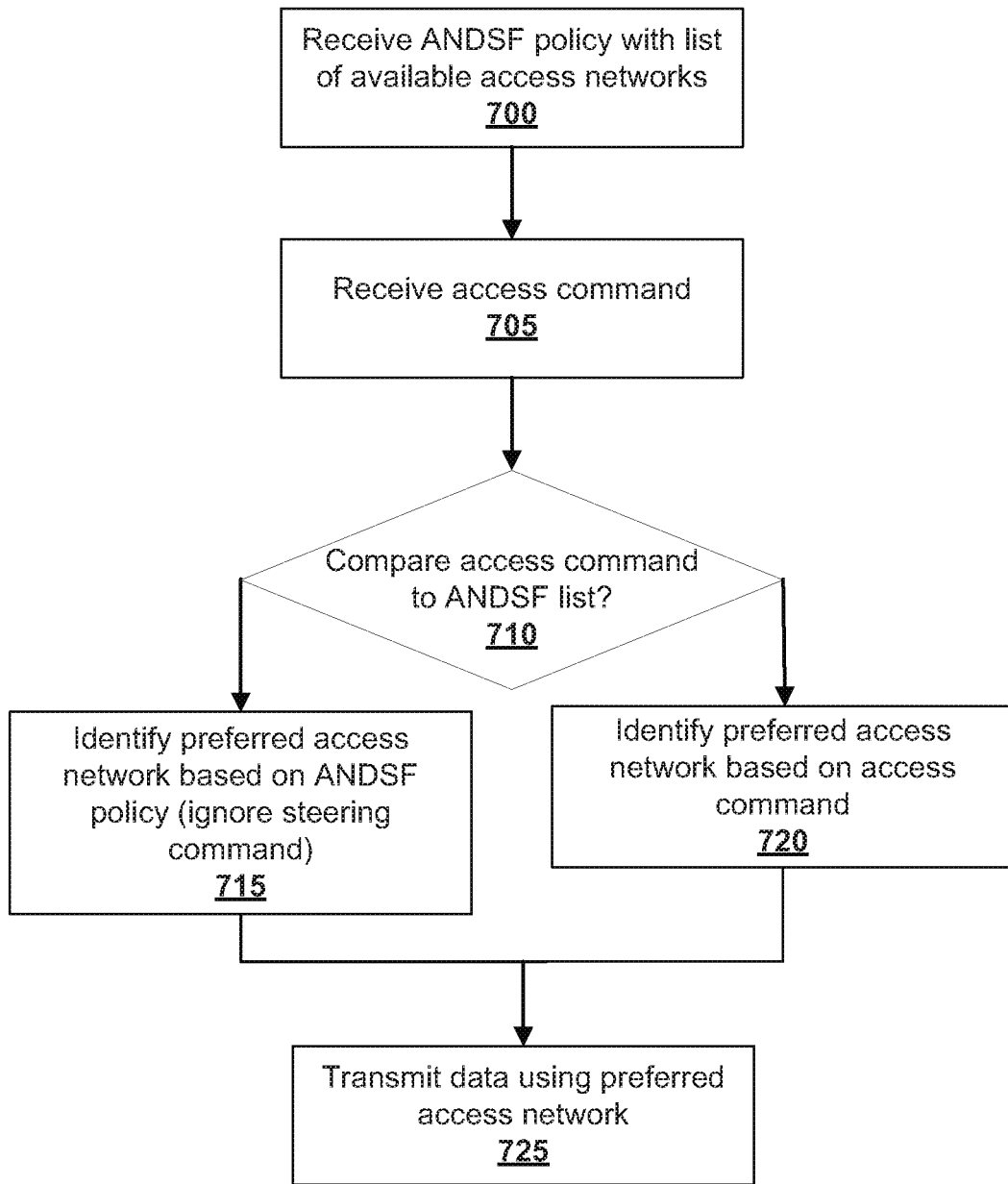
FIG. 7 illustrates an example of an access network identification procedure, in accordance with various embodiments.

FIG. 7 illustrates an example of an access network selection and traffic routing procedure, in accordance with various embodiments. At 700 a UE, such as UE 200, may receive an ANDSF policy with a first list of available networks. The first list of available networks may provide priority values for the available networks.

At 705 the UE may receive an access command directing the UE to utilize a particular access network. The UE 200 may receive the access command from an eNB or a WLAN AP as discussed above.

At 710 the UE may compare the access command to the list of access networks included in the ANDSF policy. This may include determining if the access network identified by the access command is included in the list of available access networks included in the ANDSF policy.

If the access network identified by the access command is not included in the list of available access networks, then the UE, at 715, may identify the access network based on the ANDSF policy. This may involve ignoring the access command.

If the access network identified by the access command is included in the list of available access networks, then the UE, at 720, may identify the access network based on the access command. This may include identifying the access network identified by the access command as the preferred access network. This may include identifying a network, which is included in the list available access networks, but has a lower priority value than other networks on the list. In this manner the UE may utilize the direct access command, but may limit the direct access command to networks identified by an ANDSF policy.

At 725 the UE may transmit data using the preferred access network. This may include transmitting any form of data. In some embodiments the UE may utilize different access networks for different types of data. For instance, in some embodiments the UE may transmit voice data over one access network and other data over a second access network.

Figure 8:
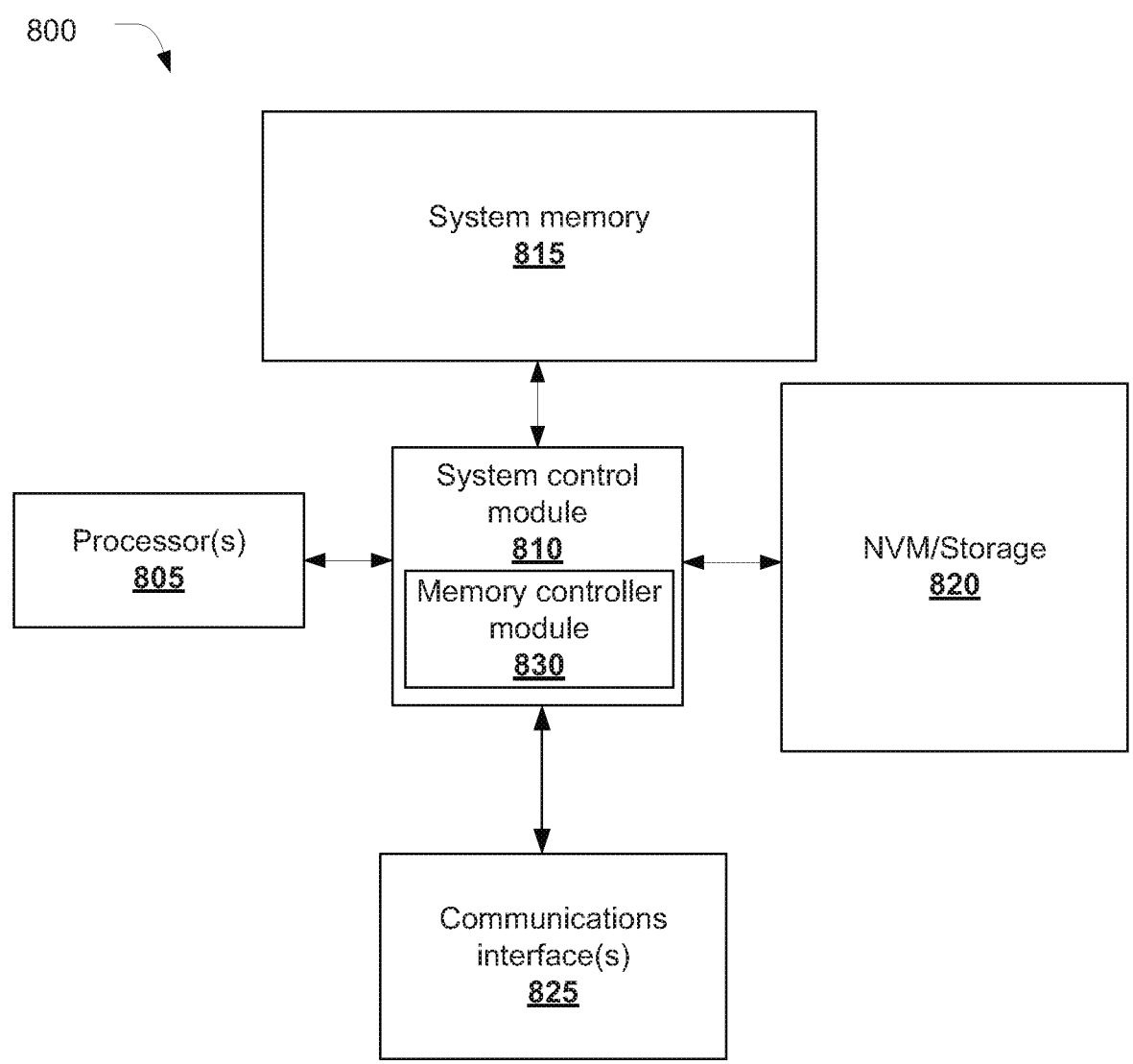
FIG. 8 schematically illustrates an example system that may be used to practice various embodiments described herein.

Embodiments of the present disclosure may be implemented into a system using any suitable hardware and/or software to configure as desired. FIG. 8 schematically illustrates an example system 800 that may be used to practice various embodiments described herein. FIG. 8 illustrates, for one embodiment, an example system 800 having one or more processor(s) 805, system control module 810 coupled to at least one of the processor(s) 805, system memory 815 coupled to system control module 810, non-volatile memory (NVM)/storage 820 coupled to system control module 810, and one or more communications interface(s) 825 coupled to system control module 810.

In some embodiments, the system 800 may be capable of functioning as the UE 110 as described herein. In other embodiments, the system 800 may be capable of functioning as the base station 105 depicted in the embodiment shown in FIG. 1 or any one of the other described embodiments. In other embodiments, the system 800 may be capable of functioning as the ANDSF server 220. In some embodiments, the system 800 may include one or more computer-readable media (e.g., system memory or NVM/storage 820) having instructions and one or more processors (e.g., processor(s) 805) coupled with the one or more computer-readable media and configured to execute the instructions to implement a module to perform actions described herein.

System control module 810 for one embodiment may include any suitable interface controllers to provide for any suitable interface to at least one of the processor(s) 805 and/or to any suitable device or component in communication with system control module 810.

System control module 810 may include memory controller module 830 to provide an interface to system memory 815. The memory controller module 830 may be a hardware module, a software module, and/or a firmware module. System memory 815 may be used to load and store data and/or instructions, for example, for system 800. System memory 815 for one embodiment may include any suitable volatile memory, such as suitable DRAM, for example. In some embodiments, the system memory 815 may include double data rate type four synchronous dynamic random-access memory (DDR4 SDRAM).

System control module 810 for one embodiment may include one or more input/output (I/O) controller(s) to provide an interface to NVM/storage 820 and communications interface(s) 825.

The NVM/storage 820 may be used to store data and/or instructions, for example. NVM/storage 820 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 820 may include a storage resource physically part of a device on which the system 800 may be installed or it may be accessible by, but not necessarily a part of, the device. For example, the NVM/storage 820 may be accessed over a network via the communications interface(s) 825.

Communications interface(s) 825 may provide an interface for system 800 to communicate over one or more network(s) and/or with any other suitable device. The system 800 may wirelessly communicate with the one or more components of the wireless network in accordance with any of one or more wireless network standards and/or protocols.

For one embodiment, at least one of the processor(s) 805 may be packaged together with logic for one or more controller(s) of system control module 810, e.g., memory controller module 830. For one embodiment, at least one of the processor(s) 805 may be packaged together with logic for one or more controllers of system control module 810 to form a System in Package (SiP). For one embodiment, at least one of the processor(s) 805 may be integrated on the same die with logic for one or more controller(s) of system control module 810. For one embodiment, at least one of the processor(s) 805 may be integrated on the same die with logic for one or more controller(s) of system control module 810 to form a System on Chip (SoC).

In various embodiments, the system 800 may be, but is not limited to, a server, a workstation, a desktop computing device, or a mobile computing device (e.g., a laptop computing device, a handheld computing device, a tablet, a netbook, a smart phone, a gaming console, etc.). In various embodiments, the system 800 may have more or less components, and/or different architectures. For example, in some embodiments, the system 800 includes one or more of a camera, a keyboard, liquid crystal display (LCD) screen (including touch screen displays), non-volatile memory port, multiple antennas, graphics chip, application-specific integrated circuit (ASIC), and speakers.

EXAMPLES

Some non-limiting examples are provided below.

Example 1 may include a user equipment (UE) to identify access networks, the UE comprising: communication circuitry to: receive access network assistance information from an evolved node B (eNB) of a radio access network (RAN) or an access point of a wireless local area network (WLAN); and network selection and traffic routing circuitry coupled with the communication circuitry to: compare the access network assistance information to a threshold value; and identify a preferred access network based at least in part on the comparison of the access network assistance information to the threshold value, wherein the communication circuitry is to: transmit data over the preferred access network; and wherein the threshold value is associated with an access network discovery and selection function (ANDSF) policy and the network selection circuitry is to selectively activate the ANDSF policy based at least in part on the comparison of the access network assistance information to the threshold value.

Example 2 may include the UE of example 1, wherein the access network assistance information includes as least a first value and a second value and the communication circuitry comprises: RAN communication circuitry to receive the first value from an eNB of a RAN; and WLAN communication circuitry to receive the second value from an access point of a WLAN, wherein the RAN communication circuitry and the WLAN communication circuitry are implemented on a common chipset.

Example 3 may include the UE of example 1, wherein the communication circuitry is to receive a plurality of ANDSF policies with individual ANDSF policies of the plurality of ANDSF policies being associated with an access network and at least one threshold value.

Example 4 may include the UE of example 1, wherein the network selection and traffic routing circuitry includes an ANDSF client and the network selection and traffic routing circuitry is to prevent the ANDSF client from considering an access network based at least in part on the comparison of the access network assistance information to the threshold value.

Example 5 may include the UE of example 4, wherein the network selection and traffic routing circuitry is to dynamically determine the threshold value based at least in part on quality of service (QoS) requirements of applications active on the UE.

Example 6 may include the UE of example 1, wherein the network selection and traffic routing circuitry includes at least one local UE connection criteria (also referred to as "RAN rules") and the network selection and traffic routing circuitry is to allow the local UE connection criteria to override the ANDSF policy based at least in part on a determination by the UE that an estimated throughput for a first network is greater than an estimated throughput for a second network.

Example 7 may include the UE of example 1, wherein the network selection and traffic routing circuitry includes at least one local UE connection criteria and is to allow the local UE connection criteria to override the ANDSF policy based at least in part on a determination by the UE that the quality of service (QoS) requirements of applications active on the UE are less than a minimum QoS threshold of the ANDSF policy.

Example 8 may include the UE of any of examples 1-7, wherein the access network assistance information includes at least one of network load (or some other parameter based on load), signal strength threshold, maximum achievable throughput, average access delay, and quality of service (QoS) support. The load may refer to access network load, backhaul load, combination of the two or some other definition.

Example 9 may include one or more tangible computer-readable media having instructions, stored thereon, that when executed cause a user equipment (UE) to: receive access network assistance information from an evolved node B (eNB) of a radio access network (RAN) or an access point of a wireless local area network (WLAN); compare the access network assistance information to a UE local threshold value or compare the access network assistance information to a value measured by the UE; filter available access network options to an access network discovery and selection function (ANDSF) client based at least in part on the comparison; identify a preferred access network based at least in part on the filtered available access network options; and transmit data over the preferred access network.

Example 10 may include the one or more media of example 9, wherein the instructions, when executed, cause the UE to dynamically determine the threshold value based at least in part on requirements of applications active on the UE.

Example 11 may include the one or more media of example 9, wherein the instructions, when executed, cause the UE to receive an ANDSF policy including an ANDSF policy threshold.

Example 12 may include the one or more media of example 11, wherein the instructions, when executed, cause the UE to selectively activate the ANDSF policy based at least in part on a comparison of the access network assistance information to the ANDSF policy threshold or based on a comparison of the value measured by the UE to the ANDSF policy default threshold.

Example 13 may include the one or more media of any of examples 9-12, wherein the access network assistance information includes at least one of network load (or some other parameter based on load), signal strength threshold, maximum achievable throughput, average access delay, and quality of service (QoS) support.

Example 14 may include a user equipment (UE) to identify access networks, the UE comprising: communication circuitry to: receive an access network discovery and selection function (ANDSF) policy from an ANDSF server; receive at least one of a steering policy or an access command from an access network; and network selection and traffic routing circuitry coupled with the communication circuitry to: identify a preferred access network based at least in part on the ANDSF policy and the at least one of a steering policy or an access command; wherein the communication circuitry is to: transmit data over the preferred access network.

Example 15 may include the UE of example 14 wherein the ANDSF policy includes a list of available access networks with associated priority values and the at least one of a steering policy or an access command is an access command directing the UE to utilize a particular access network.

Example 16 may include the UE of example 15, wherein the network selection and traffic routing circuitry is to compare the particular access network to the list of available access networks included in the ANDSF policy and to identify the particular access network as the preferred access network if it is included in the list of available access networks.

Example 17 may include the UE of example 15, wherein the network selection and traffic routing circuitry is to allow the ANDSF policy to override the access command if the particular access network is not included in the list of available access networks.

Example 18 may include the UE of example 14, wherein the ANDSF network selection policy includes a first list of available access networks, e.g. WLAN networks with associated priority values and the ANDSF routing policy including a second list of available access network types, e.g. LTE, UMTS and WLAN with associated priority values Example 19 may include the UE of example 18, wherein the network selection and traffic routing circuitry is to allow the ANDSF policy to override the steering policy for access networks that are covered under a subscription policy of the UE.

Example 20 may include the UE of example 18, wherein the network selection and traffic routing circuitry is to identify access networks appearing on both the first and second lists of available access networks and to identify the preferred access network based at least in part on combined priority scores of the access networks appearing on both the first and second lists of available access networks.

Example 21 may include one or more tangible computer-readable media having instructions, stored thereon, that when executed cause a user equipment (UE) to: receive a first list of available access networks from an access network discovery and selection function (ANDSF) server; receive at least one of a steering policy or an access command from an access network; and compare the at least one of a steering policy or an access command to the first list of available access networks; identify a preferred access network based at least in part on the comparison of the at least one of a steering policy or an access command to the first list of available access networks; and transmit data over the preferred access network.

Example 22 may include the one or more media of example 21, wherein the at least one of a steering policy or an access command is a steering policy including a second list of available access networks.

Example 23 may include the one or more media of example 22, wherein the instructions, when executed, cause the UE to limit the identification of the preferred access network to access networks appearing on both the first and second lists of available access networks Example 24 may include the one or more media of example 21, wherein the at least one of a steering policy or an access command is an access command directing the UE to utilize a particular access network Example 25 may include the one or more media of example 24, wherein the instructions, when executed, cause the UE to identify the particular access network as the preferred access network if the particular access network appears on the first list of available access networks.

Example 26 may include the one or more media of example 12, wherein the instructions, when executed, cause the UE to replace default thresholds in the ANDSF policy with the thresholds received as part of the assistance information from the network and to selectively activate the ANDSF policy based at least in part on a comparison of the values measured by the UE to the ANDSF policy threshold.

Example 27 may include the UE of example 1, wherein the network selection and traffic routing circuitry includes at least one local UE connection criteria (also referred to as "RAN rules") and the network selection and traffic routing circuitry is to allow the local UE connection criteria to override the ANDSF policy based at least in part on a flag pre-configured in the UE or received by the UE from the network.

Example 28 may include the UE of example 1, wherein the network selection and traffic routing circuitry includes an ANDSF client and the network selection and traffic routing circuitry is to prevent the ANDSF client from considering an access network based at least in part on the comparison threshold value received as part of the assistance information from the network and measurement performed by the UE.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such element. Further, ordinal indicators (e.g., first, second or third) for identified elements are used to distinguish between the element, and do not indicate or imply a required or limited number of such elements, nor do they indicate a particular position or order of such elements unless otherwise specifically stated.

What is claimed is:

1. A user equipment (UE) to identify access networks, the UE comprising:
   network selection and traffic routing circuitry to:
      determine that an Access Network Discovery and Selection Function (ANDSF) rules overriding condition is present;
      select Radio Access Network (RAN) rules, provided by a RAN, over ANDSF rules, provided by an ANDSF server, based on said determination that the ANDSF rules overriding condition is present; and
      identify a preferred access network based on the selected RAN rules; and
   communication circuitry coupled with the network selection and traffic routing circuitry, the communication circuitry to transmit or receive data over the preferred access network,
   wherein the communication circuitry is further to receive RAN assistance information from a base station of the RAN to assist identification of the preferred access network, wherein the UE is further to measure received signal strength indicator (RSSI) values of access networks, and
   wherein the RAN assistance information is to include a first threshold and a second threshold and the network selection and traffic routing circuitry is to route traffic among access networks based on a comparison of the first threshold to the RSSI values measured by the UE and a comparison of the second threshold to a network load,
   wherein the communication circuitry includes:
      RAN communication circuitry to transmit and receive data over RAN of the preferred access network; and
      WLAN (Wireless Local Area Network) communication circuitry, configured to transmit and receive data over WLAN of the preferred access network.

2. The UE of claim 1, wherein the ANDSF rules overriding condition is based on a set of pre-defined criteria relating to network performance or network access condition.

* * * * *